W. H. NEWELL.
VALVE.
APPLICATION FILED OCT. 6, 1908.

933,779. Patented Sept. 14, 1909.

Witnesses
M. C. Lyddane
J. A. L. Mulhall

Inventor
William H. Newell
By Joshua R. H. Potts
Attorney

UNITED STATES PATENT OFFICE.

WILLIAM H. NEWELL, OF PHILADELPHIA, PENNSYLVANIA, ASSIGNOR TO MARY K. NEWELL, OF PHILADELPHIA, PENNSYLVANIA.

VALVE.

933,779.  Specification of Letters Patent.  Patented Sept. 14, 1909.

Application filed October 6, 1908. Serial No. 456,497.

*To all whom it may concern:*

Be it known that I, WILLIAM H. NEWELL, a citizen of the United States, residing at Philadelphia, in the county of Philadelphia and State of Pennsylvania, have invented certain new and useful Improvements in Valves, of which the following is a specification.

My invention relates to improvements in valves, and more particularly to a construction and arrangement of washer for cocks, faucets and similar valve mechanisms.

A further object is to so construct and mount the washer as to prevent its accidental removal or displacement by the ordinary operation of the valve.

A further object is to provide a construction of washer which may be employed on any of the well known forms of cocks and faucets now in use without changing the construction of the latter.

With these and other objects in view the invention consists in certain novel features of construction, combinations and arrangements of parts as will be more fully hereinafter described and pointed out in the claims.

Figure 1:
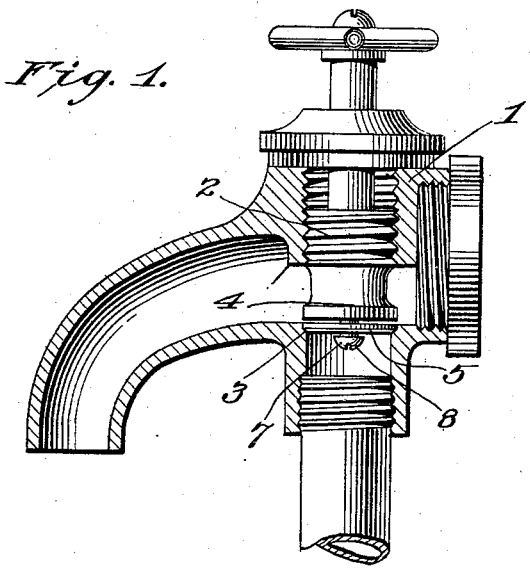
Figure 2:
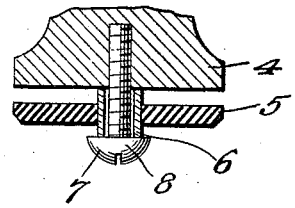
Figure 3:
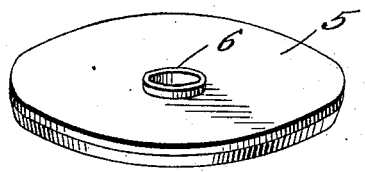

In the accompanying drawings Figure 1, is a view partly in vertical section of the faucet upon which my improved washer is employed. Fig. 2, is an enlarged sectional view showing the washer attached to the valve stem. Fig. 3, is a perspective view of the washer detached.

1 represents a casing and 2 a screw threaded valve stem, the ordinary parts of the faucet such as are in common use.

3 represents the beveled seat for the valve 4, and in connection with this ordinary construction of faucet, my improved washer 5 is employed. The washer 5 may be made of any suitable material and is in the form of a disk provided with a central opening in which a sleeve or bushing 6 is mounted, the ends of the bushing projecting above and below the upper and lower faces of the washer, and a screw 7 is passed through this sleeve or bushing with its head 8 bearing against the lower end thereof and screwed into the lower end of the valve 4, thus securing the sleeve or bushing to the valve, but permitting the washer and bushing to turn on the screw without unscrewing the latter. By an arrangement of this character the washer will not stick to the screw, nor to the end of the plunger and cannot be accidentally loosened by the ordinary operation of the valve. In devices of this character in ordinary use the valve is held directly by the screw, and, after a time, due to the washer adhering to its seat and also to the screw, the washer will become loosened by reason of the fact that the screw will be turned as the valve stem is turned in opening and closing the valve. The washer 5 with its bushing 6 therein can be sold to the trade and can be attached to the faucets and valves in use and will not require any special construction of valve to receive them.

A great many slight changes might be made in the general form and arrangement of parts described, and hence I do not restrict myself to the precise details set forth, but consider myself at liberty to make such slight changes and alterations as fairly fall within the spirit and scope of my invention.

Having thus described my invention what I claim as new and desire to secure by Letters Patent is:

1. A washer for valves comprising a disk having a central opening, and a sleeve or bushing permanently fixed in said opening extending above and below the disk.

2. In a device of the character described, a valve seat, a valve movable toward and away from the same, a washer for said valve, a central sleeve or bushing in said washer and a locking device in said sleeve or bushing securing the same to the valve.

3. In a device of the character described, a valve seat, a valve movable toward and away from the same, a washer for said valve, a central sleeve or bushing in said washer extending above and below the washer, a locking screw in said sleeve or bushing screwed into the valve and holding the bushing between the screw head and the end of the valve.

4. In a device of the character described, a valve seat, a valve movable toward and away from the same, a washer for said valve, a central sleeve or bushing in said valve, a screw located in said bushing or sleeve and permitting free rotary movement of the disk.

In testimony whereof I have signed my name to this specification in the presence of two subscribing witnesses.

WILLIAM H. NEWELL.

Witnesses:
S. W. FOSTER,
J. A. L. MULHALL.